(12) United States Patent
Bhagwat et al.

(10) Patent No.: US 10,481,205 B2
(45) Date of Patent: Nov. 19, 2019

(54) ROBUST SECURE TESTING OF INTEGRATED CIRCUITS

(71) Applicant: Seagate Technology LLC, Cupertino, CA (US)

(72) Inventors: Rajesh Maruti Bhagwat, Pune (IN); Jackson Ellis, Fort Collins, CO (US); Mark von Gnechten, Fremont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 30 days.

(21) Appl. No.: 15/704,515

(22) Filed: Sep. 14, 2017

(65) Prior Publication Data
US 2019/0033374 A1    Jan. 31, 2019

(30) Foreign Application Priority Data
Jul. 27, 2017   (IN) .............................. 201721026790

(51) Int. Cl.
| | |
|---|---|
| *G01R 31/3185* | (2006.01) |
| *G01R 31/28* | (2006.01) |
| *G06F 12/14* | (2006.01) |
| *G06F 9/30* | (2018.01) |
| *G06F 21/72* | (2013.01) |

(52) U.S. Cl.
CPC . *G01R 31/318544* (2013.01); *G01R 31/2851* (2013.01); *G06F 9/30079* (2013.01); *G06F 12/1425* (2013.01); *G06F 12/1433* (2013.01); *G06F 21/72* (2013.01); *G06F 2212/1052* (2013.01)

(58) Field of Classification Search
CPC .................................................. H03M 13/2957
USPC ........................................ 714/755, 757, 752
See application file for complete search history.

(56) References Cited

U.S. PATENT DOCUMENTS

| | | | |
|---|---|---|---|
| 6,499,124 B1 | 12/2002 | Jacobson | |
| 7,334,173 B2 | 2/2008 | Morgan et al. | |
| 7,577,886 B2 | 8/2009 | Bancel et al. | |
| 7,634,701 B2 | 12/2009 | Morgan et al. | |
| 7,694,197 B2 | 4/2010 | Bancel et al. | |
| 7,809,934 B2 | 10/2010 | Conti et al. | |
| 8,051,345 B2 | 11/2011 | GadelRab et al. | |
| 8,074,132 B2 | 12/2011 | Guettaf et al. | |
| 8,120,377 B2 * | 2/2012 | Yu ................... | G01R 31/31719 324/750.3 |
| 8,495,443 B1 | 7/2013 | Yu et al. | |
| 8,539,292 B2 | 9/2013 | Nieuwland et al. | |
| 8,977,917 B2 | 3/2015 | Han et al. | |
| 9,041,411 B2 | 5/2015 | Marinissen et al. | |

(Continued)

*Primary Examiner* — Fritz Alphonse
(74) *Attorney, Agent, or Firm* — Westman, Champlin & Koehler, P.A.

(57) ABSTRACT

A method includes configuring a first set of blocks of a plurality of blocks of an IC chip as secure data blocks, and configuring a second set of blocks of the plurality of blocks as non-secure data blocks. The method further includes receiving a test mode entry request in the IC chip. In response to the IC chip receiving the test mode entry request, carrying out a data-initialization operation on the plurality of blocks independently of whether any blocks of the plurality of blocks are configured as the secure data blocks or the non-secure data blocks. An IC chip data output is disabled during the data-initialization operation.

18 Claims, 11 Drawing Sheets

(56) References Cited

U.S. PATENT DOCUMENTS

| | | |
|---|---|---|
| 9,170,297 B2 | 10/2015 | Pugliesi-Conti |
| 9,222,973 B2 | 12/2015 | Geukes et al. |
| 2007/0008819 A1 | 1/2007 | Diessner et al. |
| 2010/0107023 A1 | 4/2010 | Guettaf et al. |
| 2010/0264932 A1 | 10/2010 | Marinissen et al. |
| 2010/0333055 A1* | 12/2010 | Yu .................... G01R 31/31719 716/108 |
| 2011/0185110 A1 | 7/2011 | Smigelski et al. |
| 2012/0216001 A1 | 8/2012 | Ramly et al. |
| 2012/0246528 A1 | 9/2012 | Pugliesi-Conti |
| 2012/0278630 A1 | 11/2012 | Little et al. |
| 2014/0108786 A1* | 4/2014 | Kreft ....................... G06F 21/71 713/156 |
| 2017/0089978 A1 | 3/2017 | Hao et al. |
| 2017/0176530 A1 | 6/2017 | Cottrell et al. |
| 2018/0181524 A1* | 6/2018 | Schulz ................ G06F 13/4045 |

* cited by examiner

ROBUST SECURE TESTING OF INTEGRATED CIRCUITS

BACKGROUND

Integrated circuit (IC) chips (e.g., controller chips of data storage drives) may be capable of operating in multiple modes. The multiple modes may include a "test mode" and a "functional mode," which is typically a normal operating mode of the IC chip. The test mode may primarily be used during the qualification of the IC chip. In some cases, to enable proper testing of the IC chip, the test mode may unintentionally provide access to certain secure data components of the IC chip, which may not be accessible in the functional mode. A malicious entity (e.g., a hacker) may take advantage of such access in the test mode and obtain confidential information from the IC chip.

SUMMARY

Embodiments of the disclosure relate to security features that prevent access to confidential integrated circuit (IC) chip data via a test mode.

In one embodiment, a method is provided. The method includes configuring a first set of blocks of a plurality of blocks of an IC chip as secure data blocks (e.g., blocks for containing sensitive information), and configuring a second set of blocks of the plurality of blocks as non-secure data blocks (e.g., blocks that may contain non-sensitive information). The method further includes receiving a test mode entry request in the IC chip. In response to the IC chip receiving the test mode entry request, a data-initialization operation is carried out on the plurality of blocks independently of whether any blocks of the plurality of blocks are configured as the secure data blocks or as the non-secure data blocks. An IC chip data output is disabled during the data-initialization operation.

This summary is not intended to describe each disclosed integrated circuit scan testing embodiment. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to security features that prevent access to confidential integrated circuit (IC) chip data via a test mode.

Figure 1A:
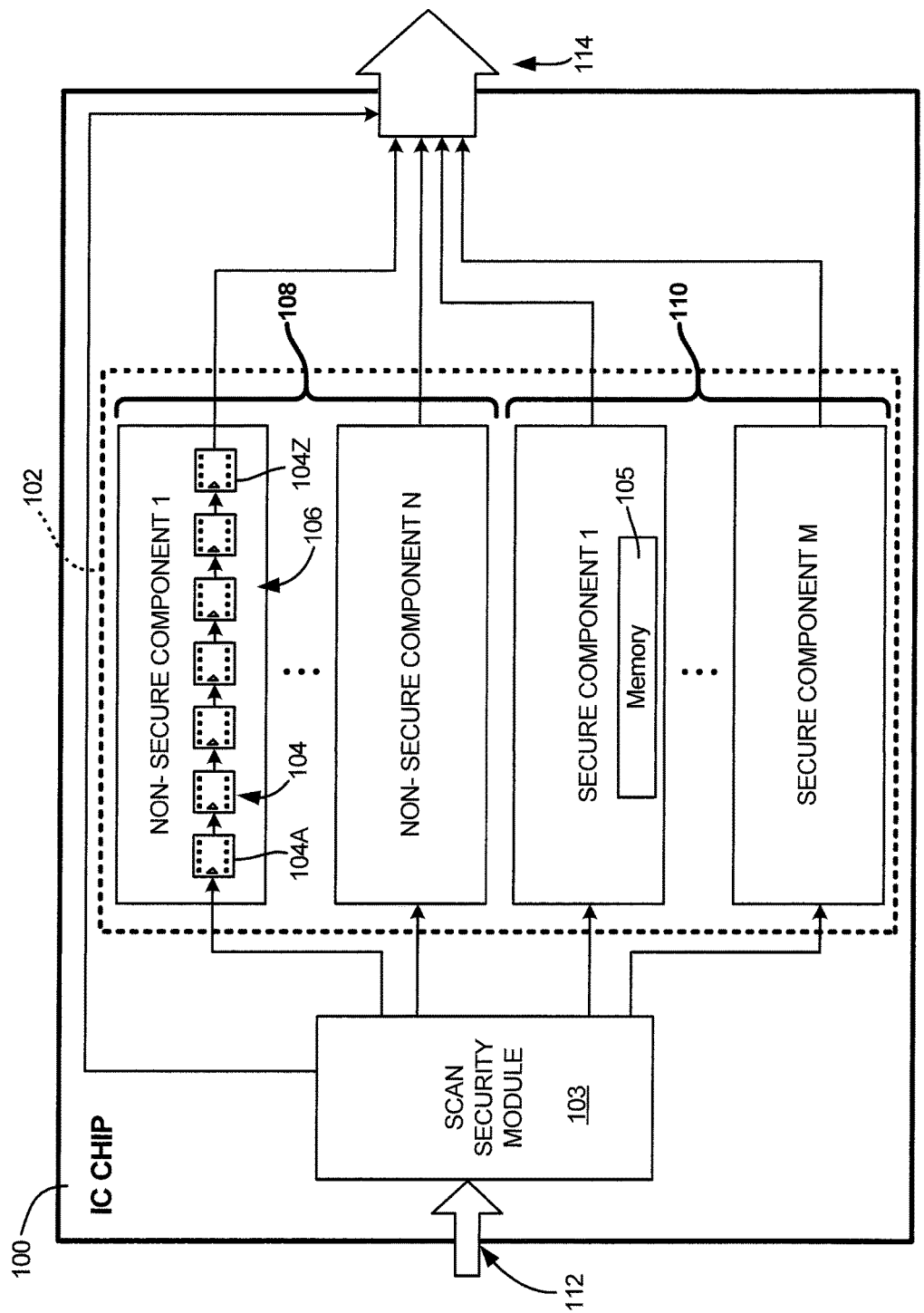
FIG. 1A is a simplified block diagram showing an IC chip that includes security features in accordance with one embodiment.

FIG. 1A is a simplified block diagram showing an IC chip 100 that includes security features in accordance with one embodiment. IC chip 100 may include a plurality of partitions or blocks (e.g., programmable blocks or programmable logic blocks, memories, etc.) 102 and a scan security module 103 that helps implement the security features, which are described in detail further below. Individual ones of the plurality of blocks 102 may include flip-flops 104 connected together to form scan chains 106, which enable scan chain testing of the IC chip 100. Scan chain testing is carried out to detect manufacturing faults in IC chips such as 100. In the interest of simplification, flip-flops 104 are only shown within one of the plurality of blocks 102 and only one scan chain 106 is shown in that block. However, substantially all of the blocks 102 may include flop-flops such as 104 connected in scan chains such as 106. Further, one or more of the plurality of blocks 102 may include memories (e.g., memory 105), which may be tested using built-in self-tests (BISTs). In a scan chain 106, an input of a first flip-flop 104A is configured to receive scan test data from an external tester (not shown) via an input (e.g., input pin(s)) 112 of the IC chip 100, and an output of a last flip-flop 104Z in the scan chain 106 may be connected to an output (e.g., output pin(s)) 114 of the IC chip 100.

Some of the plurality of blocks 102 may handle/store confidential information, which may include secret data such as passwords, root keys, etc. Accordingly, in the example illustrated in FIG. 1A, the plurality of blocks 102 may include non-secure blocks 1-N denoted by reference numeral 108 and secure blocks 1-M denoted by reference numeral 110.

As indicated earlier, an IC chip is typically capable of operating in multiple modes, which include a test mode in which a scan chain test may be carried out, and a functional mode that is a normal operating mode of the IC chip. In general, in a scan chain test, each scan chain undergoes a test operation. As part of the test operation, an input stimulus that includes a scan pattern known as an input vector is injected into the scan chain via an IC input pin to which the first flip-flop of the scan chain is coupled. Data is shifted in and loaded to all flip-flops in the scan chain to complete a scan-in operation for that chain. The scan pattern is then shifted out to obtain a scan test output via the output pin connected to the last flip-flop of the scan chain. A similar scan test is carried out on other scan chains of the IC chip.

A malicious entity (e.g., a hacker) may take advantage of access to secure data elements (e.g., secure data blocks) in the test mode (e.g., by repeatedly carrying out scan test-related operations) and obtain confidential information from the IC chip if it does not have adequate security features. In one example, the hacker may allow the chip to boot in the functional mode and then, after some time elapses, may place the chip in the test mode without powering it off. The hacker may then scan-shift the data from the chip and read the sensitive information lying inside the chip register flops or memory elements.

In some cases, to prevent a malicious entity from obtaining confidential information, the IC chip may be configured such that a reset operation is necessary for entry into the test mode. Such a reset operation may be an asynchronous reset, which does not need a clock to be running for the reset to be carried out, or a synchronous reset that needs a running clock. An asynchronous reset may result in more elements of the IC chip being reset due to the operation being substantially independent of a clock. However, forcing such reset operations prior to entry into the test mode may not result in all elements of the IC chip being reset. For example, certain flip-flops (e.g., first-in first out (FIFO) flip-flops employed in FIFO registers) may not be reset using asynchronous or synchronous reset operations. In general, there may be many flip-flops in the IC chip, which do not have a reset pin. Further, memories may not have an embedded reset function. Accordingly, after the reset operation, such elements may still contain confidential information that the malicious entity may obtain when the IC chip is in the test mode.

Certain other measures for preventing malicious entities from accessing confidential information from specific secure blocks in an IC chip may involve implementing additional logic around the specific secure block(s). This may add significant complexity in the overall design. Further, this local or block-specific approach may result in some portion of the specific secure block(s) being kept out of the scan chain test, which leads to coverage loss during manufacturing tests.

Also, the localized additional logic or special circuitry takes care of security of the local or specific block in a static mode. When there is a threat detected, the contents of the specific block including the confidential information are cleared. For example, consider a case where a central processing unit (CPU) reads the confidential/secure data from a first secure block, and that data travels to another destination (e.g., a second secure block). During this movement, there are substantially high chances of leaving data traces behind in the intermediate registers and pipelines. These intermediate paths are generally not secured. Securing these multiple paths may turn into an arduous task.

Figure 2A:
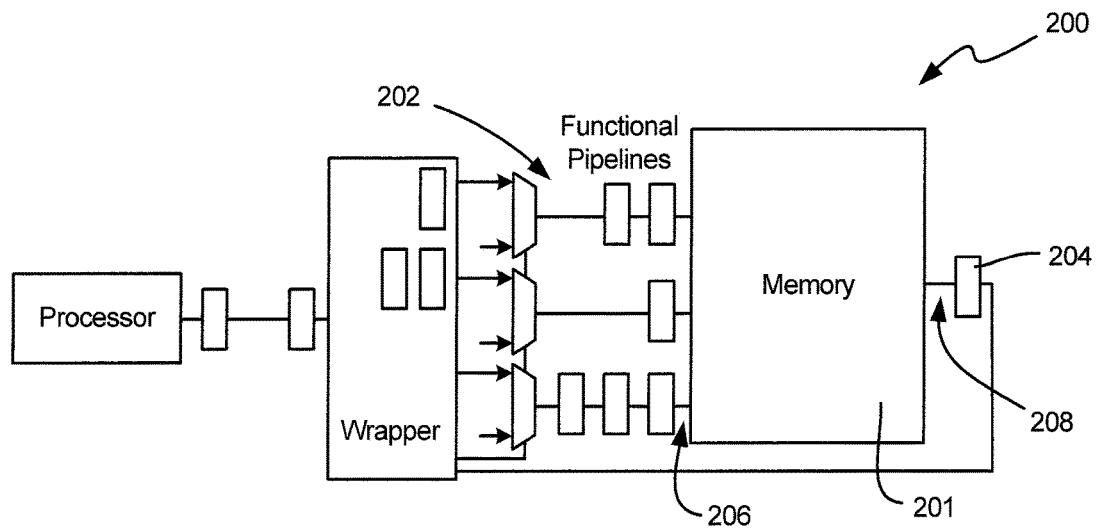
FIGS. 2A and 2B are diagrammatic illustrations of on chip memory systems.
Figure 2B:
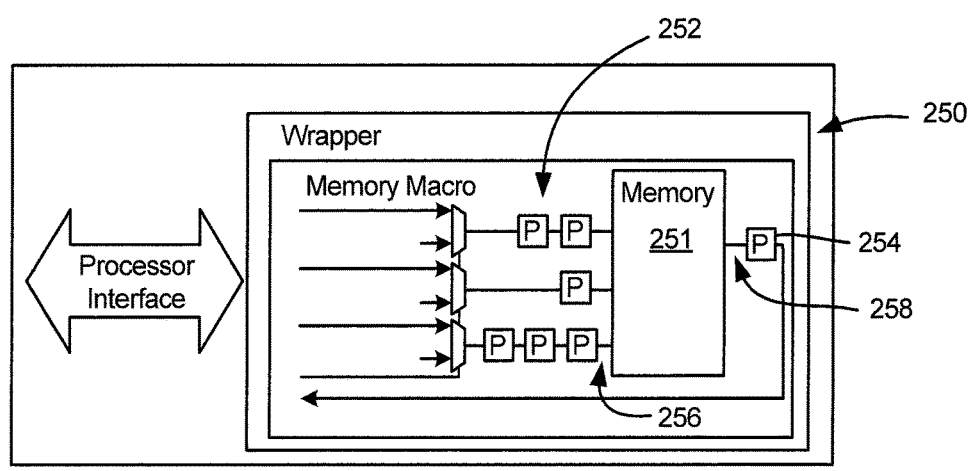

Further, certain types of memory systems may include built-in pipeline stages shown in FIGS. 2A and 2B, which are diagrammatic illustrations of such memory systems. In FIG. 2A, memory system 200 includes a main memory component 201 and pipeline stages 202 and 204 connected to an input 206 and an output 208, respectively, of the main memory component 201. In FIG. 2B, memory system 250 includes a main memory component 251 and pipeline stages 252 and 254 connected to an input 256 and an output 258, respectively, of the main memory component 251. Read operations from main memory components such as 201 and 251 may result in some potentially confidential data from the main memory component 201, 251 being left in pipeline stages such as 204 and 254. Generally, contents of memories such as 200 and 250 are cleared by overwriting contents of the main memory components such as 201 and 251. However, this may be insufficient due to the possible presence of a portion of the confidential data in pipeline stages such as 204 and 254.

Referring back to FIG. 1A, in accordance with embodiments of the disclosure, to prevent a malicious entity from accessing confidential information in the test mode, IC chip 100 includes scan security module 103 that carries out data initialization operations before scan chain operations are commenced. As can be seen in FIG. 1A, scan security module 103 is connected to input pins of IC chip 100 and is also coupled to both inputs and outputs of the of the scan chains 106. Details regarding logic elements within scan security module 103 are provided further below in connection with FIG. 6A-6K.

When the IC chip 100 receives a request to be placed in a test mode via an input pin, the scan security module 103 is notified of the request. In response to receiving the request, the scan security module 103 first carries out a data initialization operation on substantially all the blocks 102 of the IC chip 100 independently of whether the blocks are secure (components 1-M) 110 or non-secure (components 1-N) 108. The data initialization operation may include shifting a predetermined bit pattern (e.g., a pattern including all 0s, all 1s, a repetitive pattern of 1s and 0s, a random data pattern, etc.) into the scan chains 106 and writing predetermined data (e.g., all 0s, all 1s, repetitive data patterns of 1s and 0s, random data, etc.) into the memories. Additionally, scan security module 103 disables data outputs 114 from scan chains 106 during the data initialization operation, and may provide a predetermined output values (e.g., one or more 0s or 1s, a repetitive pattern, a random data pattern, etc.) from the IC chip 100 during the initialization operation. To clear intermediate registers, built-in pipeline stages or other pipelines that may contain confidential data, a portion of the data written into the memories as part of the data initialization operation are read from the memories (e.g., memory 105) by scan security module 103. This substantially eliminates the possibility of confidential data being present in the registers, built-in pipeline stages or other pipelines associated with or coupled to such memories.

Figure 1B:
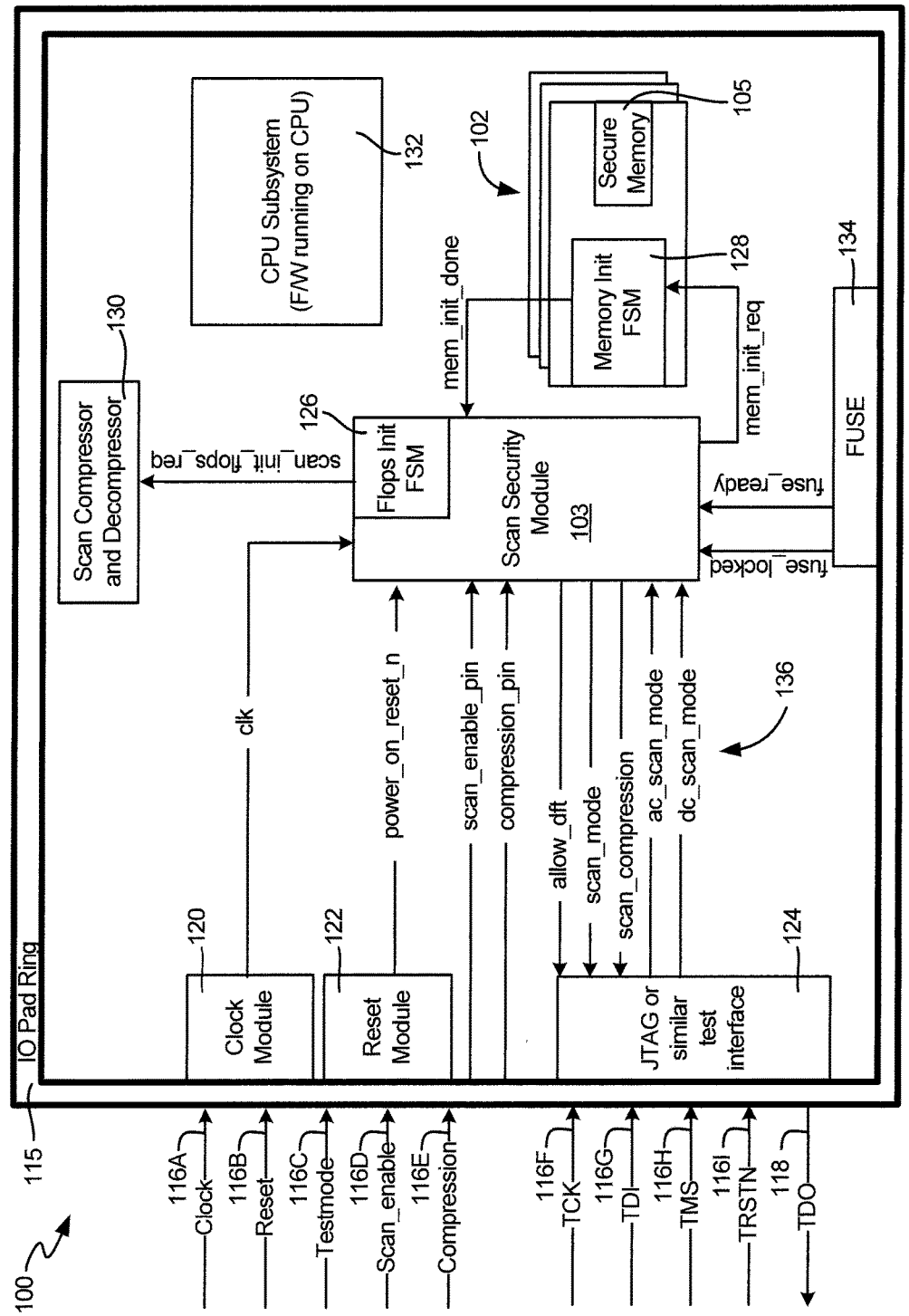
FIG. 1B is a simplified block diagram showing an overview of circuit components within the IC chip of FIG. 1A that help implement security features in accordance with one embodiment.

FIG. 1B is a simplified block diagram showing an overview of circuit components within IC chip 100 that help implement security features in accordance with one embodiment. As noted above, data initialization operations are carried out with the help of scan security module 103. In the embodiment of FIG. 1B, the data initialization of flip-flops (e.g., flip-flops 104A through 104Z and other flip-flops in IC chip 100) are carried out with the logic circuitry 126 within scan security module. Operation of logic circuitry 126 is described further below in connection with FIG. 5, which illustrates a scan chain initialization finite state machine (FSM) in accordance with one embodiment. Further, in the embodiment of FIG. 1B, initialization operations on secure memories such as 105 are carried out by logic circuitry 128 that is proximate to the secure memory 105 and implements a memory initialization FSM that is described further below in connection with FIG. 4. As can be seen in FIG. 1B, logic circuitry 128 receives an input signal from, and provides an output signal to, scan security module 103. Scan security module 103 also receives signals 136 from and/or provides signals to clock module 120, reset module 122, Joint Test Action Group (JTAG) or other similar test interface 124, fuse 134 and scan compressor or decompressor 130. Details regarding signals 136 communicated with scan security module 103 are provided further below in connection with FIG. 3. As can be seen in FIG. 1B, IC chip 100 also includes a central processing unit (CPU) subsystem 132 on which suitable firmware (F/W) runs. IC chip 100 includes an input/output (I/O) ring pad 115 having pins that are capable of receiving a plurality of inputs (e.g., inputs 116A-116E) to IC chip 100 and providing one or more outputs (e.g., output 118) from IC chip 100. Of the plurality of inputs shown in FIG. 1B, inputs 116F-116I are JTAG inputs that include a test clock (TCK) input 116F, a test data in (TDI) 116G, a test mode select (TMS) input 116H and a test data rest (TRSTN) 116I. Output 118 is a JTAG test data out (TDO).

Figure 3:
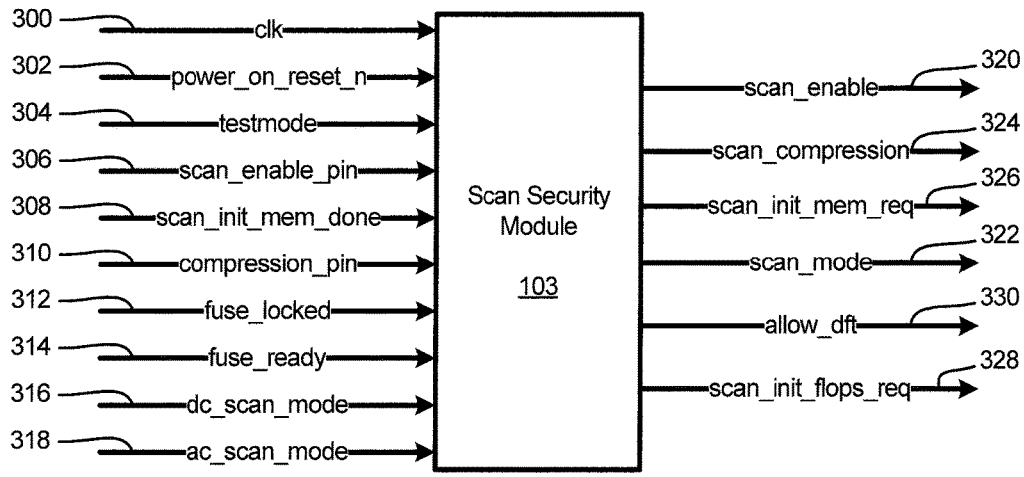
FIG. 3 is a block diagram that illustrates an example interface of a scan security module in accordance with one embodiment.

FIG. 3 is a block diagram that illustrates an example interface of scan security module 103. As can be seen in FIG. 3, an input portion of the interface includes a first plurality of signals denoted by reference numerals 300-318 and an output portion of the interface includes a second plurality of signals 320-330. It should be noted that the interface shown in FIG. 3 is a non-limiting example and the signals in the input and/or output portions of the interface may differ in number and/or type in different embodiments.

| Reference designator in FIG. 3 | Signal name | Signal direction | Signal description |
| --- | --- | --- | --- |
| 300 | Clk | Input | Either a test clock or a reference clock signal. |
| 302 | power_on_reset_n | Input | An active low power on reset signal. The polarity of the reset signal depends on the actual implementation. |
| 304 | testmode | Input | A special IC chip I/O. A signal value of '0', for example, indicates a functional mode and a signal value of '1', for example, indicates a test mode. |
| 306 | scan_enable_pin | Input | A special IC chip I/O indicating a scan enable pin. |
| 308 | Scan_init_mem_done | Input | Notification from a secure memory module indicating a completion of a memory initialization operation. |
| 310 | compression_pin | Input | A special IC chip I/O indicating a scan compression mode. |
| 312 | fuse_locked | Input | Indication of a blown fuse. |
| 314 | fuse_ready | Input | The contents of the fuse are read. |
| 316 | dc_scan_mode | Input | Slow scan mode setting via a JTAG user data repository/register (UDR). |
| 318 | ac_scan_mode | Input | At speed scan mode setting via JTAG UDR. |
| 320 | scan_enable | Output | Secured scan enable control signal for the subsequent internal operation. |
| 322 | scan_mode | Output | Secured scan mode control signal for the subsequent internal operation. |
| 324 | scan_compression | Output | Secured scan compression mode control signal for the subsequent internal operation. |
| 326 | scan_init_mem_req | Output | A request to the secure memory logic to initialize the memory contents. This is a level signal (e.g., the signal may be asserted or set to an "active" state by setting it to a high voltage level, and the signal may be asserted or set to an "inactive" state by setting it to a low voltage level). |
| 328 | scan_init_flops_req | Output | A request to the scan flop-chain shift logic to initialize the scan flop-chains. This is a level signal that operates in a manner similar to the Scan_init_mem_req. |
| 330 | allow_dft | Output | Design for test (DFT) mode is allowed to use. When '0', it is disabled. |

In some embodiments, logic within scan security module 103 operates in two different modes, with operations in accordance with a first mode being carried out when there is a direct entry into the test mode, and operations in accordance with a second mode being carried out when there is an indirect entry from the functional mode into the test mode. Operations in accordance with the first mode may be carried out, for example, when there is entry into the test mode with a reset assertion. Steps carried out in the first mode of operation include asserting the scan_init_mem_req and the scan_init_flops_req level signals high. The scan_init_mem_req signal is provided to a memory FSM, and the scan_init_flops_req signal is provided to a scan chain initialization FSM.

Figure 4:
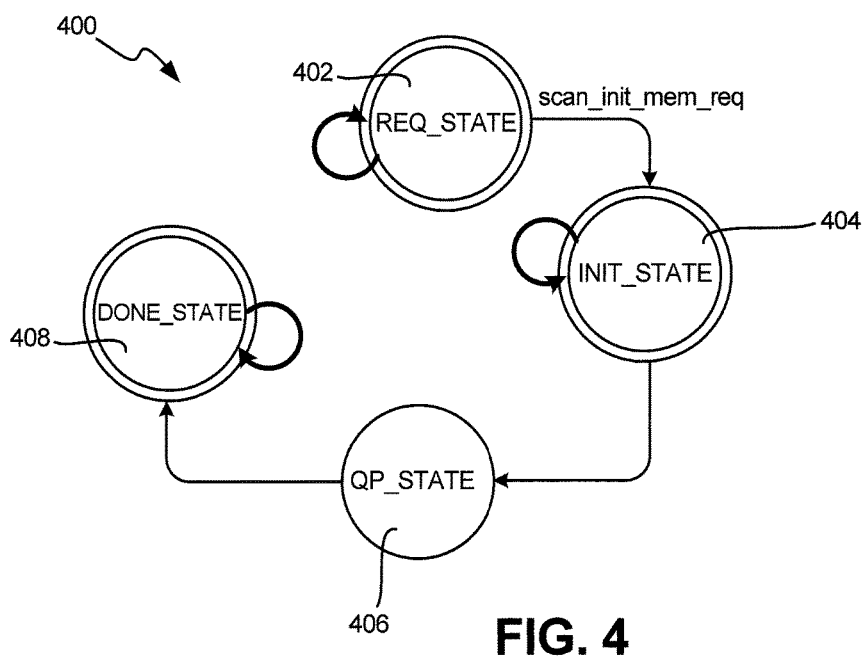
FIG. 4 is a diagrammatic illustration of a memory initialization finite state machine (FSM) in accordance with one embodiment.
Figure 5:
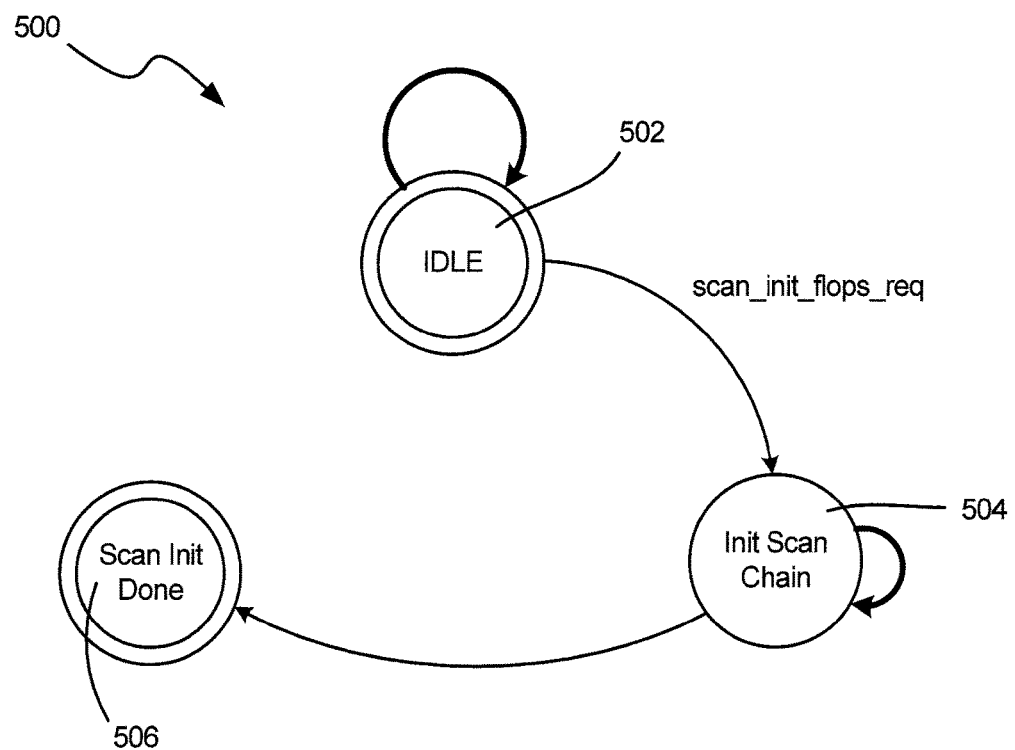
FIG. 5 is a diagrammatic illustration of a scan chain initialization FSM in accordance with one embodiment.

FIGS. 4 and 5 are diagrammatic illustrations of an example memory initialization FSM 400 and an example scan chain initialization FSM 500, respectively. As can be seen in FIG. 4, memory initialization FSM 400 includes a Request state 402 a Memory Initialization state 404, Pipeline Flush state 406 and a Memory Initialization Done state 408. Upon the assertion of the scan_init_mem_req signal 326, an Initialization Done flag is set to 0 (or any other suitable value to indicate a start of the memory initialization process) and a Current Address field is set to an initial memory location address. Also, a transition takes place from Request state 402 to Memory Initialization state 404. In Memory Initialization state 404, a write operation into each memory location is carried out to flush secrets or confidential information that may be present in the memory. In one non-limiting example, this initially involves writing a "0" in the first memory location having the initial memory location address and incrementing the Current Address Field by 1. The process of writing a 0 and incrementing the Current Address Field by 1 is repeated for each subsequent memory location until the Current Address Field includes a final memory location address and all memory locations are populated by 0s. At this point, a transition takes place from the Memory Initialization state 404 to the Pipeline Flush state 406. At state 406, one location of the memory is read to flush read pipeline flip-flops around the memory. It should be noted that, instead of reading one location at state 406, a small number of memory locations greater than one memory location may be read to flush the read pipeline flip-flops. Once flushing of the read pipeline flip-flops is complete, the Initialization Done flag is set to 1 (or any other suitable value to indicate completion of the memory initialization process) and a transition to the Memory Initialization Done state 408 takes place. Here, scan_init_mem_done signal 308 is asserted to indicate the completion of the memory initialization process to the scan security module 103. It should be noted that, in some embodiments, there is no exit from the Memory Initialization Done state 408 to ensure that there is only one chance after reset to perform the memory initialization operation.

During the performance of the memory initialization operations described above in connection with FIG. 4, operations of scan chain initialization FSM 500 may also be carried out. However, it should be noted that, in different embodiments, operations of FIG. 5 may instead be carried out either before or after the operations of the FIG. 4. Scan chain initialization operations are described below in connection with FIG. 5.

As can be seen in FIG. 5, scan chain initialization FSM 500 includes an Idle state 502, a Scan Chain Initialization state 504 and a Scan Chain Initialization Done state 506. Upon reset, a Scan Initialization Flops Done flag is set to 0 or any other suitable initial value, and a Scan Chain Length counter is set to a suitable initial value (e.g., set to 0). When scan_init_flops_req signal 328 is asserted high, FSM 500 transits from Idle state 502 to Scan Chain Initialization state 504 and internally sets scan_mode 322 equal to 1 and scan_enable 320 equal to 1. In Scan Chan Initialization state 504, the Scan Chain Length counter increments by 1 per clock cycle and 0s are shifted into all scan chains. During the shifting of 0s into the scan chains, outputs from the scan chains are disconnected and predetermined output values (e.g., one or more 0s or 1s, a repetitive pattern, a random data pattern, etc.) are provided from the IC chip. When all the scan chains are initialized, the Scan Initialization Flops Done flag is set to 1 (or any other suitable value to indicate completion of the scan chain initialization process) and a transition to the Scan Chain Initialization Done state 506 takes place. Here, scan_init_flops_done signal is asserted to indicate the completion of the scan chain initialization process to the scan security module 103. It should be noted that, in some embodiments, there is no exit from the Scan Chain Initialization Done state 606 to ensure that there is only one chance after reset to perform the scan chain initialization operation.

It should be noted that the JTAG interface initiated operations are blocked until the above-described initialization operations are done. At the end of the initialization operations, the allow_dft signal 330 is asserted high indicating a green light to perform other DFT functions.

In addition to being able to directly enter into the test mode, embodiments of the disclosure also allow for entry into the test mode from the functional mode. As indicated above, the functional mode of the IC chip is treated as a safe mode. In some embodiments, the safe mode may be implemented by way of one or more bits of a fuse that may include a plurality of bits. The one or more bits of the plurality of bits of the fuse may be assigned as "lock" bits. The fuse may be locked (e.g., by burning/blowing the lock bits) to ensure safety of confidential data in the functional mode. Accordingly, the fuse bit is typically burnt before an IC chip is shipped to a customer and, in general, may be locked to prevent a malicious entity from gaining access to confidential data stored in the IC chip. When an IC chip is returned by a customer, a test may be carried out by placing the IC chip in the test mode along with reset. This will result in initialization of data in a manner described above in connection with FIGS. 4 and 5. However, in some embodiments, secure firmware may override the fuse bit(s) and the customer-returned IC chip may be put into the test mode from the functional mode without reset to debug the functional states without initialization of the data stored in the IC chip. In embodiments of the disclosure, when the fuse is not locked (e.g., when the lock bits are not yet burnt), the initialization operations described in connection with FIGS. 4 and 5 are bypassed and DFT operations are allowed.

FIGS. 6A-6K are diagrammatic illustrations showing scan security logic within a scan security module such as 103 of FIG. 1. As can be seen in FIG. 6A-6K, scan security logic sub-modules include a clock domain Synchronization sub-module 600 (shown in FIG. 6A), a Secure Mode Generation sub-module 602 (shown in FIG. 6B), a Delayed Scan Initialization Request sub-module 604 (shown in FIG. 6C), a Flop Initialization Complete Flag Generation sub-module 606 (shown in FIG. 6D), a Memory Initialization Complete Flag Generation sub-module 608 (shown in FIG. 6E), an Initialize Flops Request Generation sub-module 610 (shown in FIG. 6F), an Initialize Memories Request Generation sub-module 612 (shown in FIG. 6G), an Enable/Disable DFT Operation sub-module 614 (shown in FIG. 6H), a Secure Scan Mode Generation sub-module 616 (shown in FIG. 6I), a Secure Scan Enable Generation sub-module 618 (shown in FIG. 6J) and a Secure Scan Compression Mode Generation sub-module 620 (shown in FIG. 6K).

Figure 6A:
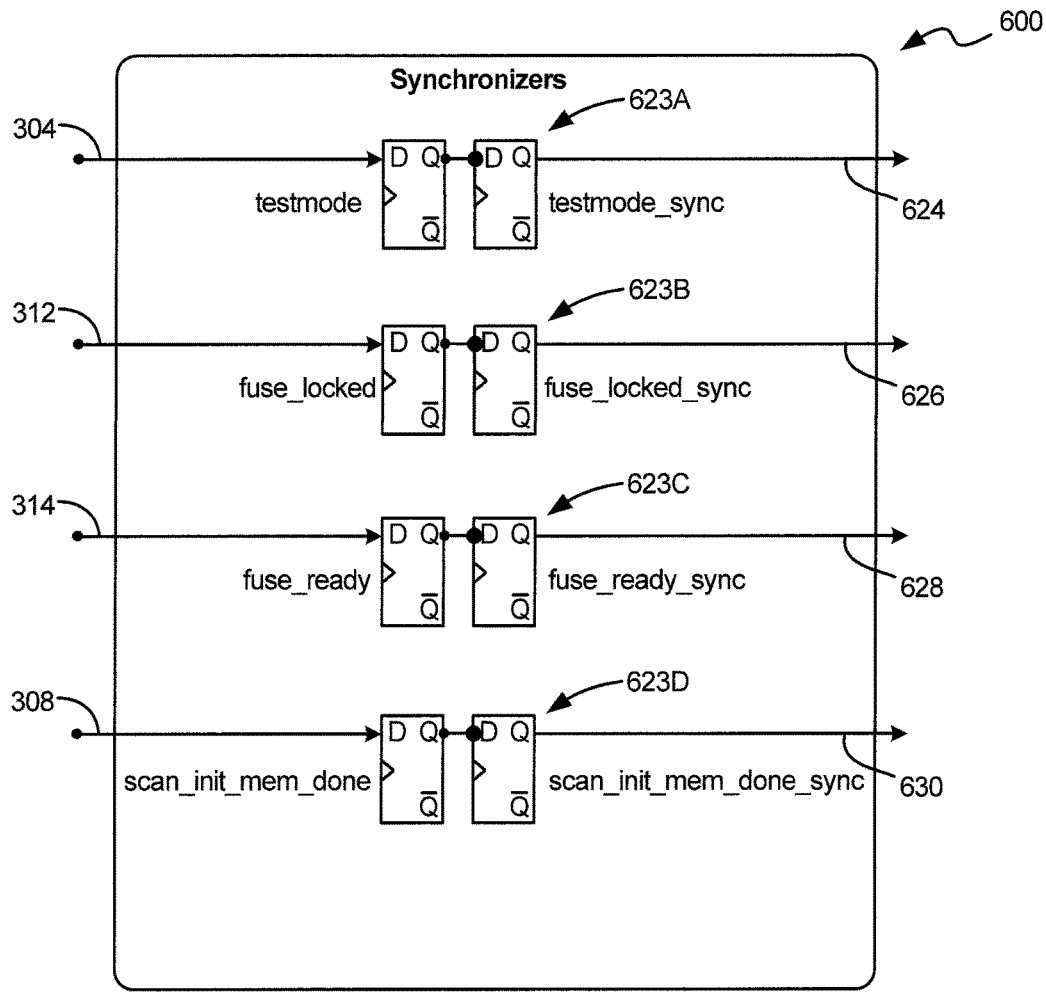
FIGS. 6A-6K are diagrammatic illustrations showing scan security logic within a scan security module in accordance with one embodiment.

Synchronization sub-module 600 is employed to synchronize asynchronous signals in a current clock domain. In the embodiment of FIG. 6A, logic within synchronization sub-module 600 includes multiple 2-stage flip-flops 623A-623D that operate in a reference clock or a test clock domain. First 2-stage flip-flops 623A receive testmode signal 304 and outputs a synchronized testmode signal (testmode_sync) 624. Similarly, second, third and fourth 2-stage flip-flops 823B, 823C and 823D receive fuse_locked, fuse_ready and scan_init_mem_done signals 312, 314 and 308, respectively, and output corresponding synchronized signals (fuse_locked_sync 626, fuse_ready_sync 628 and scan_init_mem_done sync 630).

Figure 6B:
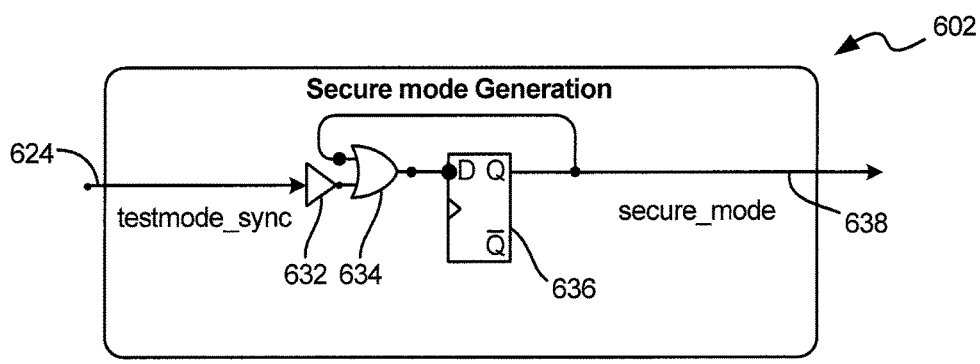

Secure Mode Generation sub-module 602 includes an inverter 632, an OR gate 634 and a flip_flop 636, which are connected in the configuration shown in FIG. 6B. As noted above, an IC chip is in a secure mode when the chip operates in the functional mode. Accordingly, flip-flop 636 is set in the functional mode. As can be seen in FIG. 6B, testmode_sync 624 is input into sub-module 602 and a secure_mode signal 638 is output by sub-module 602. When testmode pin/signal 304 (and therefore testmode_sync 624) is '0', the IC chip enters the functional mode upon reset. When testmode pin/signal 304 (and therefore testmode_sync 624) is '1', the IC chip enters the test mode, which is a non-secure mode.

Figure 6C:
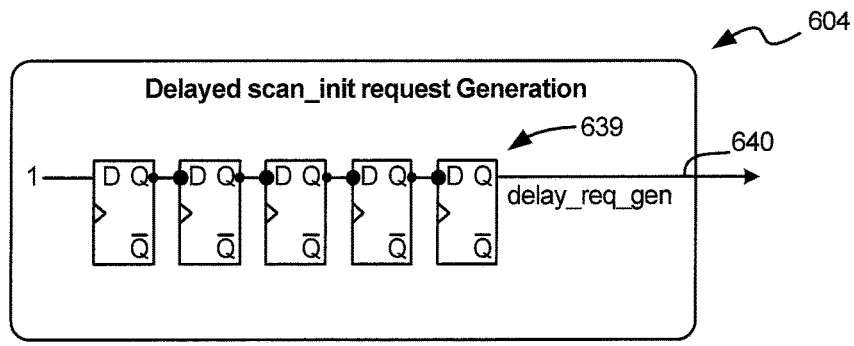

Delayed Scan Initialization Request sub-module 604 includes logic that ensures that the scan_init_mem_req and the scan_init_flops_req signals 326 and 328 will not get asserted substantially immediately after the reset. In the embodiment of FIG. 6C, the generation of these requests is delayed by at least 5 clock cycles (e.g., by 5-flop chain 639) after the de-assertion of the reset. The delay_req_gen output signal is denoted by reference numeral 640.

Figure 6D:
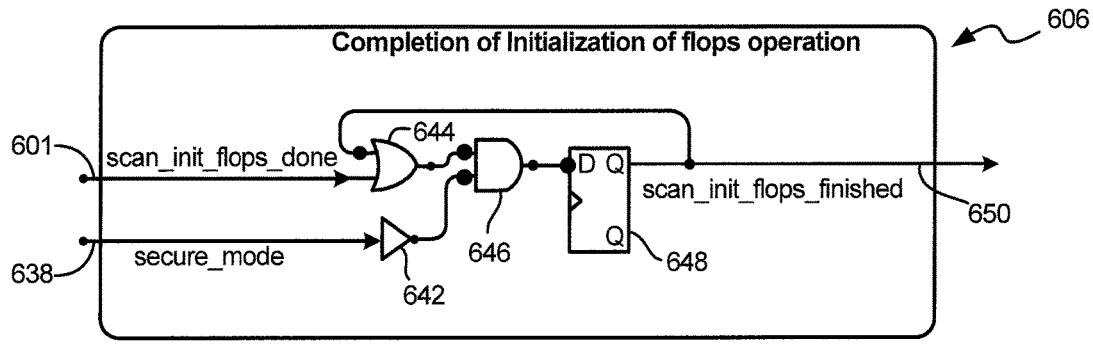

Flop Initialization Complete Flag Generation sub-module 606 includes an inverter 642, an OR gate 644, an AND gate 646 and a flip-flop 648 connected in the configuration shown in FIG. 6D. Inputs include a scan_init_flops_done signal 601 and secure mode signal 638. The output signal (scan_init_flops_finished signal 650) is asserted in the non-secure mode when the scan_init_flops_done signal 601 is high.

Figure 6E:
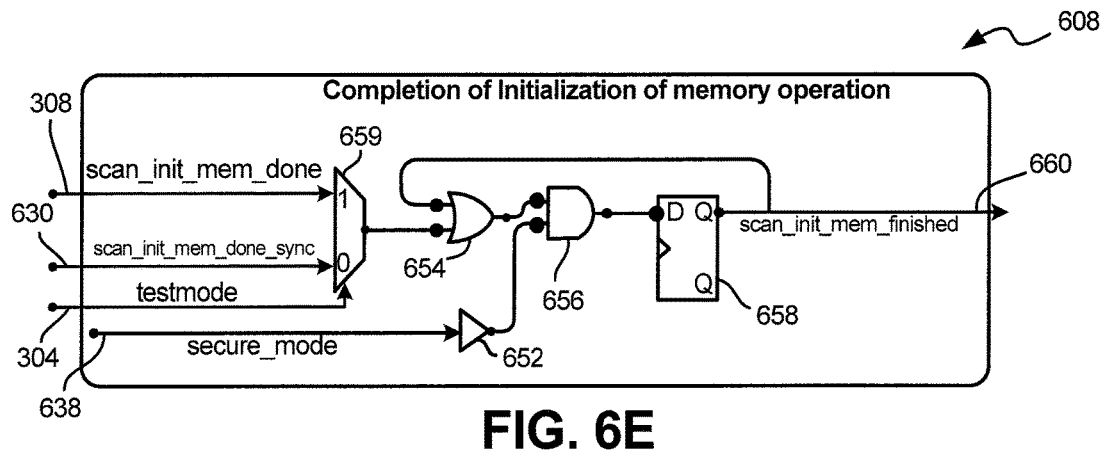

Memory Initialization Complete Flag Generation sub-module 608 shown in FIG. 6E includes logic elements similar to those included in Flop Initialization Complete Flag Generation sub-module 606. Accordingly, sub-module 608 includes an inverter 652, an OR gate 654, an AND gate 656 and a flip-flop 658. Additionally, in the test mode, one clock is active and therefore, to select the unsynchronized version of the scan_init_mem_done signal 308, a multiplexer 659 is implemented. Inputs to sub-module 608 include scan_init_mem_done signal 308, scan_init_mem_done sync signal 630, testmode signal 304 and secure_mode signal 638. The output signal (scan_init_mem_finished signal 660) is asserted in the non-secure mode when the scan_init_mem_done signal 308 is high. In the test mode, the entire circuit 608 operates using a single clock.

Figure 6F:
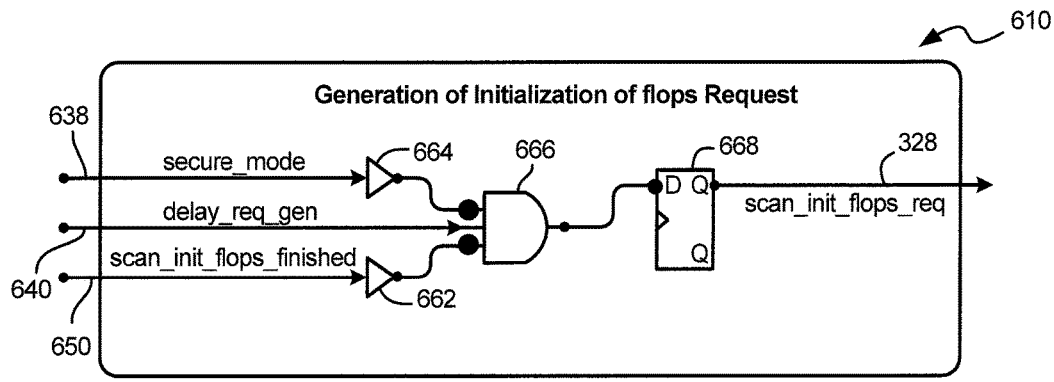
Figure 6G:
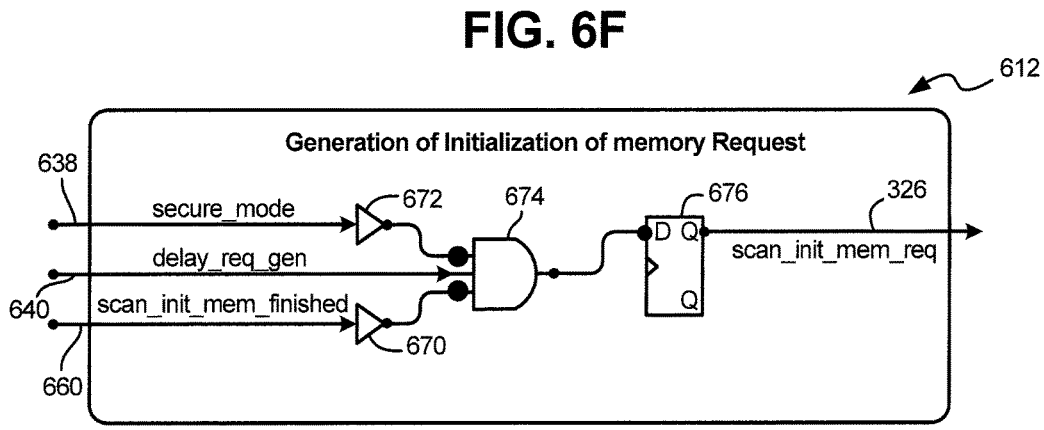

Initialize Flops Request Generation sub-module 610 includes inverters 662 and 664, an AND gate 666 and a flip-flop 668 connected in the configuration shown in FIG. 6F. Inputs to sub-module 610 include secure_mode signal 638, delay_request_gen signal 640 and scan_init_flops_finished signal 650. Soon after a reset, the logic of sub-module 610 evaluates conditions for the entry into the non-secure mode, which include a gap of at least 5 clocks and an initialization operation being not yet finished. Upon fulfilling these conditions, the scan_init_flops_req signal 328 is asserted high. This is a level signal and stays asserted high until the acknowledgement of the completion of the initialization of all scan flops is reached.

Initialize Memories Request Generation sub-module 612 includes logic components that are substantially similar to the logic components of sub-module 610. Accordingly, sub-module 612 includes inverters 670 and 672, an AND gate 674 and a flip-flop 676 connected in the configuration shown in FIG. 6G. Inputs to sub-module 610 include secure_mode signal 638, delay_request_gen signal 640 and scan_init_mem_finished signal 660. Soon after a reset, the logic of sub-module 612 evaluates conditions for the entry into the non-secure mode, which include a gap of at least 5 clocks and an initialization operation being not yet finished. Upon fulfilling these conditions, the scan_init_mem_req signal 326 is asserted high. This is a level signal and stays asserted high until the acknowledgement of the completion of the initialization of all secure memories is reached.

Figure 6H:
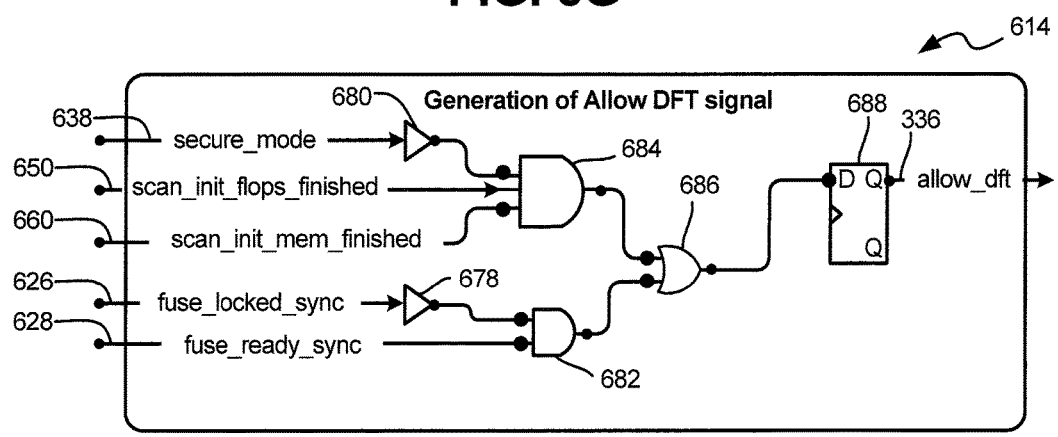

Enable/Disable DFT Operation sub-module 614 includes inverters 678 and 680, a 2-input AND gate 682, a 3-input AND gate 684, an OR gate 686 and a flip-flop 688 connected in the configuration shown in FIG. 6H. Inputs to sub-module 614 include secure_mode signal 638, scan_init_flops_finished signal 650, scan_init_mem_finished signal 660, fuse_locked_sync signal 626, fuse_ready_sync signal 628. As indicated above, in embodiments of the disclosure, there is a special feature which allows for debugging the silicon by putting the chip from functional mode to the test mode for internal development before the fuse is blown. Once the fuse is blown, the entry to any DFT mode is allowed (by allow_dft signal 330 output by sub_module 614) after the hard power on reset assertion.

Figure 6I:
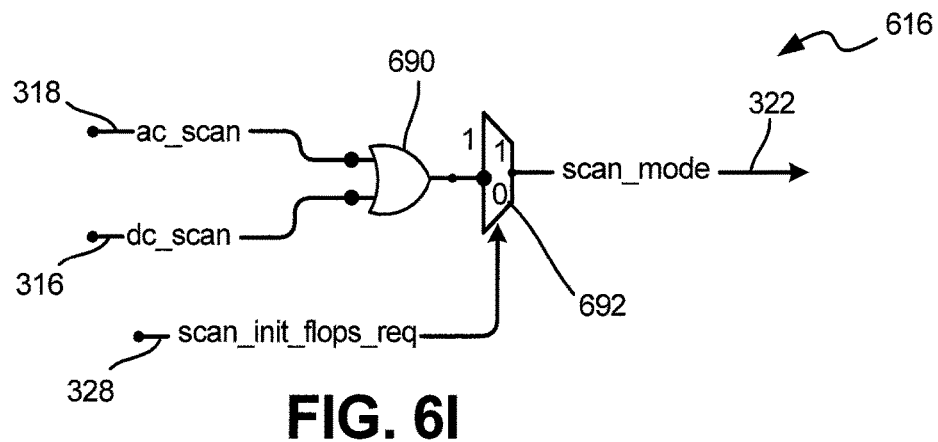

Secure Scan Mode Generation sub-module 616 shown in FIG. 6I includes an OR gate 690 and a multiplexer 692. The scan mode or scan shift mode is utilized to initialize the flip-flops of the different scan chains in the IC chip. Entry into the scan mode is carried out by forceful assertion of the mode. After the initialization operation of the flip-flops is complete, the secured scan mode signal for internal use follows the user controlled AC or DC scan mode settings programmed via JTAG. Accordingly, inputs to sub-module 616 are ac_scan_mode 318, dc_scan_mode 316 and scan_init_flops_req signal 328, and the output is scan_mode signal 322.

Figure 6J:
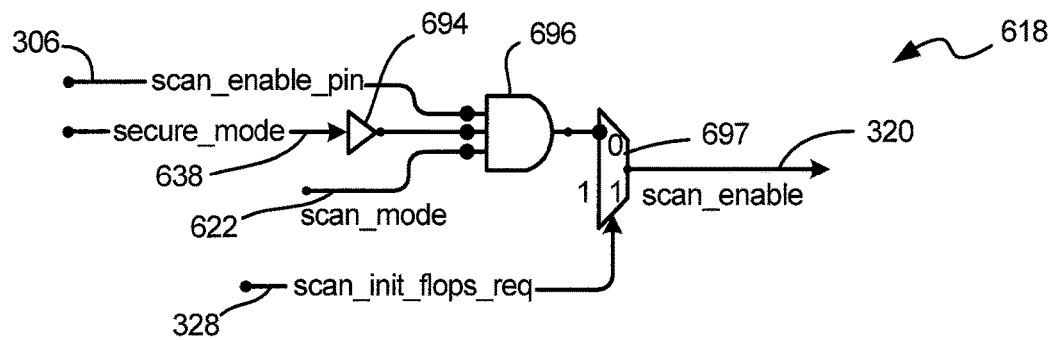

Secure Scan Enable Generation sub-module 618 shown in FIG. 6J includes an inverter 694, a 3-input AND gate 696 and a multiplexer 697. The scan mode or scan shift mode and the scan enable are utilized to initialize the flip-flops of the different scan chains in the IC chip. Entry into the scan mode is carried out by forceful assertion of the mode. After the initialization operation is complete, the secured scan enable signal for internal use follows the user controlled scan enable pin of the chip. Accordingly, inputs to sub-module 618 are scan_enable_pin 306, secure_mode signal 638, scan_mode signal 322 and scan_init_flops_req signal 328, and the output is scan_enable signal 320.

Figure 6K:
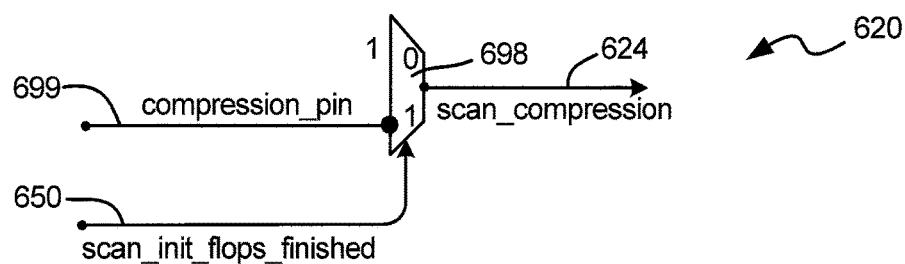

Secure Scan Compression Mode Generation sub-module 620 shown in FIG. 6K is a configuration (including multiplexer 698) where all scan flop-chains are initialized in the compression mode to reduce initialization time. Inputs to sub-module 620 include compression pin 699 and scan_init_flops_finished signal 650, and the output is a scan_compression signal 624. A user may choose either the compressed or the uncompressed modes. The counter values will change accordingly. Typically compressed scan mode is about 100 times faster than the non-compressed mode.

Figure 7:
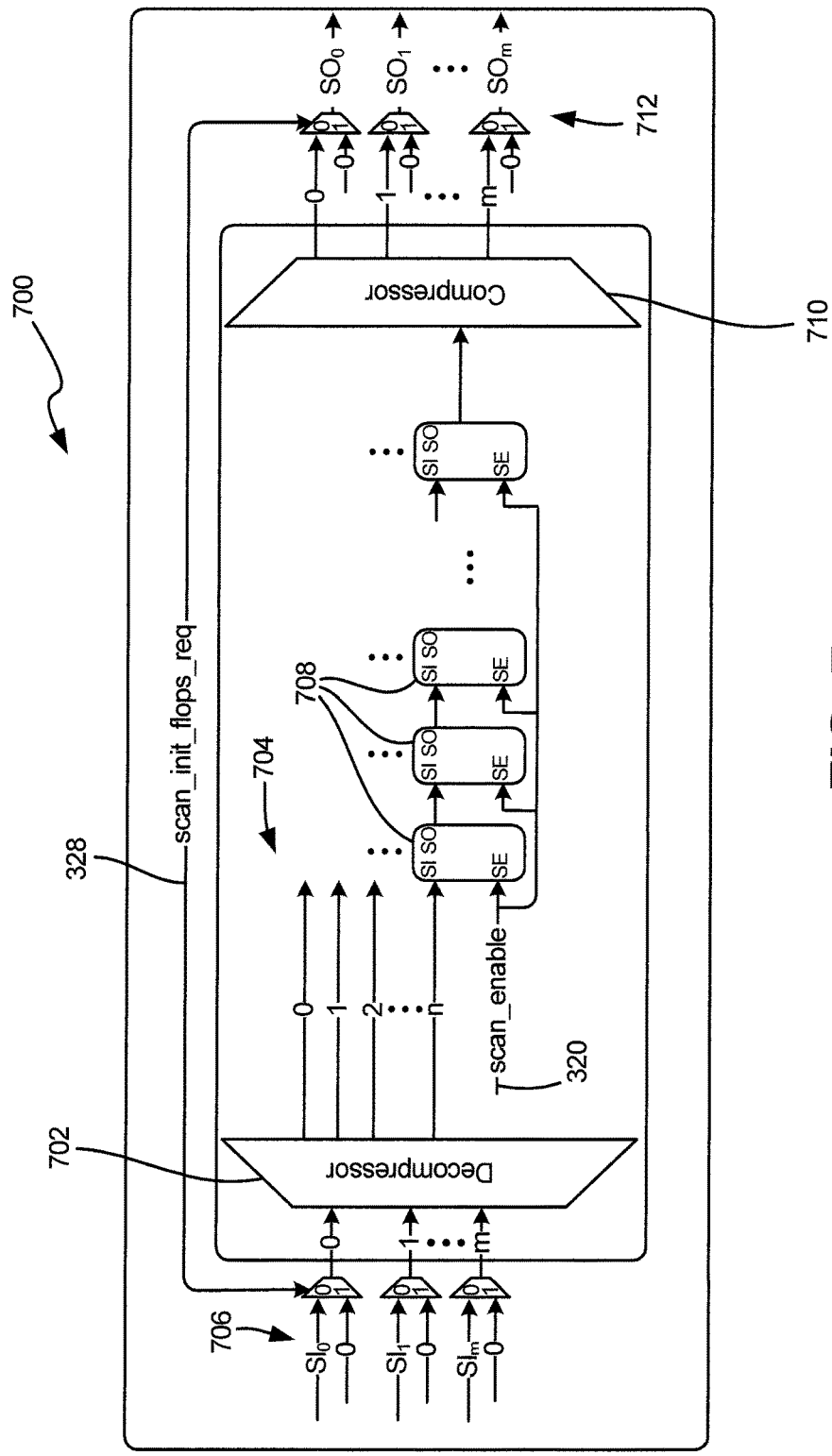
FIG. 7 is a diagrammatic illustration showing logic that may be employed in an IC chip to provide scan security in accordance with one embodiment.

FIG. 7 is a diagrammatic illustration showing logic that may be employed in an IC chip 700 to provide scan security. In IC chip 700, includes a decompressor 702 that receives compressed input patterns for a plurality of scan chains 704 via multiplexers 706 and provides a decompressed output to individual ones the plurality of scan chains 704. In the interest of simplification, flip-flops 708 of only the $n^{th}$ scan chain of the plurality of scan chains 704 is shown in FIG. 7. As can be seen in FIG. 7, each scan chain 704 receives a decompressed scan pattern input and a secured scan_enable signal 320, which allows the scan patterns to advance through flip-flops 708. An uncompressed output of each scan chain is input into a compressor 710, which provides a compressed scan chain output to multiplexers 712. As indicated above, when scan_init_flops_req signal 328 is asserted, outputs of multiplexers 712 are forced to predetermined patterns or values that are unrelated to data contained in the flops prior to the scan flop chain initialization operation. This ensures that a malicious entity does not get access to confidential data by carrying out a scan shift operation in the test mode.

Figure 8:
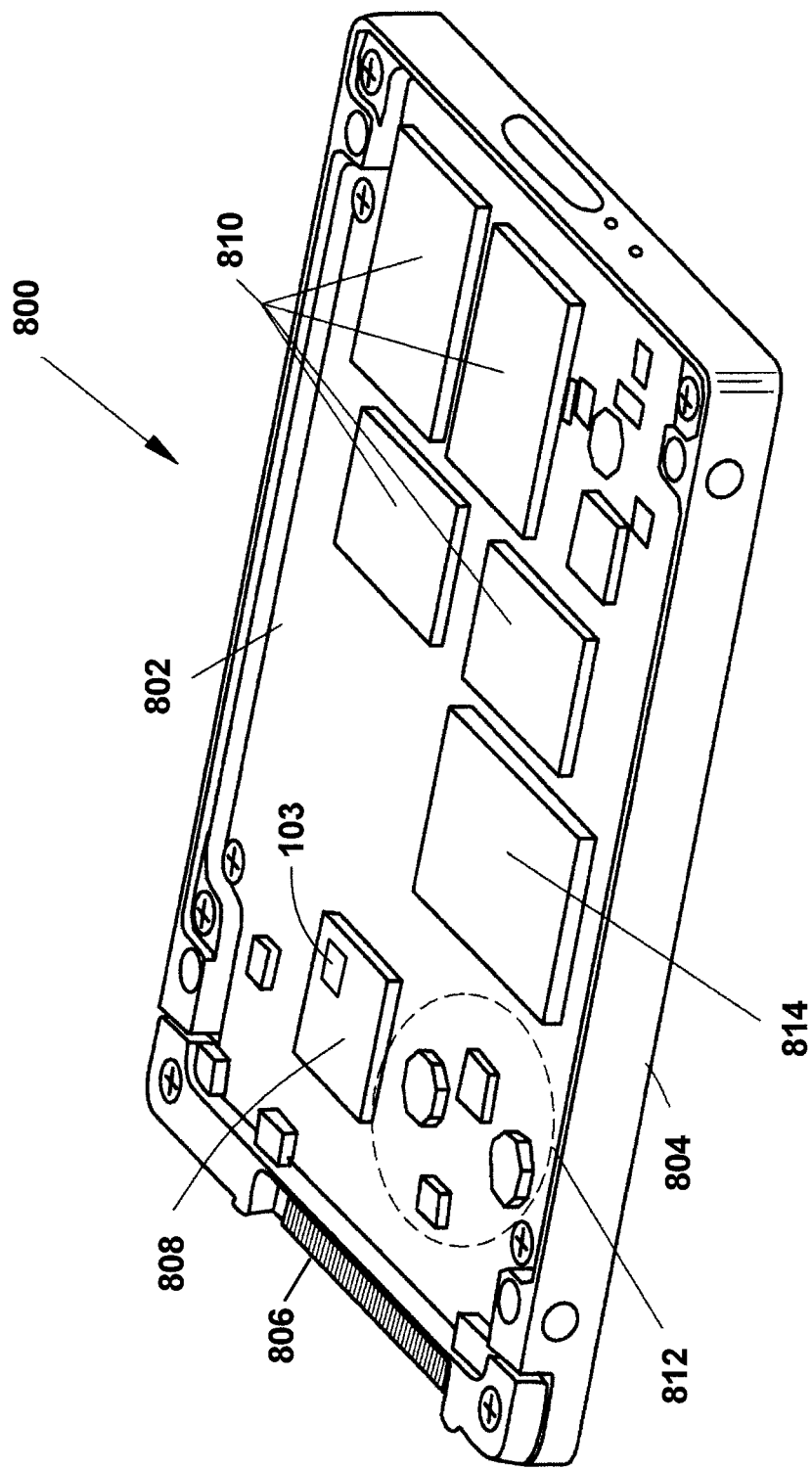
FIG. 8 is an isometric view of a solid-state drive that employs that employs an IC chip that includes security features in accordance with one embodiment.

FIG. 8 illustrates an oblique view of a solid state drive (SSD) 800 in accordance with one embodiment, which includes a scan security module such as 103 of FIG. 1A. SSD 800 includes one or more circuit card assemblies 802 and typically includes a protective, supportive housing 804, a top cover (not shown), and one or more interface connectors 806. SSD 800 further includes a controller ASIC 808, one or more non-volatile memory devices 810, and power regulation circuitry 812. The memory devices 810 are essentially the SSD's data storage media. SSD 800 may include erasure blocks as the physical storage locations within memory device 810, which may include Flash memory devices, for example. In some applications, SSD 800 further includes a power-backup energy storage device, such as a super-capacitor 814.

In accordance with certain aspects, the SSD 800 includes the circuit card assembly 802 that includes a connector 806 for connection to a host computer (not shown). In accordance with certain aspects, the connector 806 includes a NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), IEEE (institute of electrical and electronics engineers)-1394, USB (universal serial bus) or other interface connector adapted for connection to a host computer.

In SSD 800, ASIC controller 808 may include scan security module 103 described above and other related circuitry for preventing access to confidential information within ASIC controller 808 by a hacker. It should be noted that, in such an embodiment, ASIC controller 808 including scan security module 103 may be a single ASIC (e.g., a SOC).

Data from a host computer (not shown in FIG. 8) is received in SSD 800 via connector 806. That received data is provided to drive controller ASIC 808, which stores the data in one or more memory devices 810. In response to a request by a host computer for data stored in SSD 800, information read from memory device(s) 810 to satisfy the request is sent from SSD 800 to the host computer.

As indicated above, existing schemes to secure sensitive data during test mode implement various complex localized or block-specific circuits for protecting the sensitive data. In contrast, the above-described embodiments provide a universal solution where no special complex, specific circuitry is needed to protect individual blocks. The above-described embodiments may be applied over any kind of IC.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
providing an integrated circuit (IC) chip having a plurality of blocks;
configuring a first set of blocks of the plurality of blocks of the IC chip as secure data blocks, with at least one of the secure data blocks comprising a memory;
configuring a second set of blocks of the plurality of blocks of the IC chip as non-secure data blocks;
receiving a test mode entry request in the IC chip;
in response to the IC chip receiving the test mode entry request, carrying out a data-initialization operation on the plurality of blocks independently of whether any blocks of the plurality of blocks are configured as the secure data blocks or the non-secure data blocks, the data-initialization operation including writing a predetermined data pattern into the memory to initialize the memory; and
disabling an IC chip data output during the data-initialization operation.

2. The method of claim 1 and further comprising, as part of the data-initialization operation, reading a portion of the predetermined data pattern from the memory into a pipeline register coupled to the memory, thereby flushing the pipeline register.

3. The method of claim 1 and wherein the plurality of data blocks comprises a plurality of scan chains, and wherein each of the plurality of scan chains comprises a plurality of flip-flops, and wherein carrying out the data-initialization operation comprises shifting a predetermined data pattern into all of the plurality of flip-flops in all of the plurality of scan chains.

4. The method of claim 1 and wherein the test mode entry request is a direct test mode entry request.

5. The method of claim 1 and wherein the test mode entry request is an indirect test mode entry request from a functional mode of the IC chip.

6. The method of claim 5 and wherein the functional mode is a safe mode that is implemented by setting a fuse bit.

7. The method of claim 6 and wherein, if the fuse bit is set, carrying the out a reset of the IC chip and carrying out the data-initialization operation.

8. The method of claim 6 and further comprising providing a firmware override that enables bypassing the data-initialization operation to read data from the IC chip.

9. The method of claim 6 and further comprising providing a bypass feature that provides access to data in to IC chip without carrying out the data initialization operation if the fuse bit is not set.

10. An integrated circuit (IC) chip comprising:
a plurality of blocks in which some blocks are configured to store secure data and other blocks are configured to store non-secure data, the plurality of data blocks comprises a plurality of scan chains, with each of the plurality of scan chains comprising a plurality of flip-flops and at least one of the plurality of scan chains including at least one flip-flop without a reset pin in the plurality flip-flops; and a scan security module configured to:
  in response to the IC chip receiving a test mode entry request, carry out a data-initialization operation on the plurality of blocks independently of whether any blocks of the plurality of blocks are configured to store the secure data or the non-secure data;
  shift a predetermined data pattern into the at last one flip-flop without the reset pin as part of the data-initialization operation; and
  disable an IC chip data output during the data-initialization operation.

11. The IC chip of claim 10 and wherein at least one of the plurality of blocks comprises a memory, and wherein the scan security module is configured to initiate an operation to write a predetermined data pattern into the memory as part of the data-initialization operation.

12. The IC chip of claim 10 and further comprising a pipeline register coupled to the memory, and wherein the scan security module is further configured to read a portion of the predetermined data pattern from the memory into the pipeline register coupled to the memory.

13. A method comprising:
  providing an IC chip having a plurality of scan chains and at least one memory;
  receiving a test mode entry request in the IC chip having the plurality of scan chains and the at least one memory; and
  in response to the IC chip receiving the test mode entry request, carrying out a data-initialization operation on the plurality of scan chains and the at least one memory, the data initialization operation including writing a first predetermined data pattern into the at least one memory to initialize the at least one memory, and reading a portion of the predetermined data pattern from the at least one memory into a pipeline register coupled to the at least one memory, thereby flushing the pipeline register.

14. The method of claim 13 and further comprising disabling an output of the IC chip during the data-initialization operation.

15. The method of claim 13 and wherein each of the plurality of scan chains comprises a plurality of flip-flops, and wherein carrying out the data-initialization operation comprises shifting a second predetermined data pattern into all of the plurality of flip-flops in all of the plurality of scan chains.

16. The method of claim 13 and wherein the test mode entry request is a direct test mode entry request.

17. The method of claim 13 and wherein the test mode entry request is an indirect test mode entry request from a functional mode of the IC chip.

18. The method of claim 17 and wherein the functional mode is a safe mode that is implemented by setting a fuse bit.

* * * * *

UNITED STATES PATENT AND TRADEMARK OFFICE
CERTIFICATE OF CORRECTION

PATENT NO. : 10,481,205 B2
APPLICATION NO. : 15/704515
DATED : November 19, 2019
INVENTOR(S) : Rajesh Maruti Bhagwat et al.

It is certified that error appears in the above-identified patent and that said Letters Patent is hereby corrected as shown below:

In the Claims

In Column 13, Line 11, please delete "last" and insert --least--

Signed and Sealed this
Third Day of March, 2020

Andrei Iancu
*Director of the United States Patent and Trademark Office*